3,737,437
WATER-SOLUBLE METAL PHTHALOCYANINE
DYESTUFFS
Hanswilli von Brachel, Offenbach am Main, and Friedrich Aldebert, Frankfurt am Main, Germany, assignors to Cassella Fabwerke Mainkur Aktiengesellschaft, Frankfurt am Main-Fechenheim, Germany
No Drawing. Continuation of application Ser. No. 832,025, June 10, 1969. This application Feb. 29, 1972, Ser. No. 230,470
Claims priority, application Switzerland, Aug. 12, 1968, 12,078/68
Int. Cl. C09b 47/04
U.S. Cl. 260—314.5        1 Claim

ABSTRACT OF THE DISCLOSURE

Water-soluble metal phthalocyanine dyestuffs of the formula

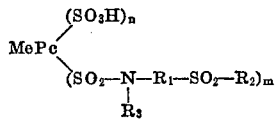

and the preparation thereof and the use thereof, particularly as reactive dyestuffs for cellulose materials.

---

This application is a continuation of application Ser. No. 832,025 filed June 10, 1969.

The present invention relates to water-soluble metal phthalocyanine dyestuffs having the formula

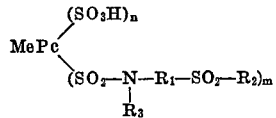

wherein MePc is the radical of a stable, water-insoluble metal phthalocyanine; $R_1$ is alkylene having 1–4 carbon atoms; $R_2$ is β-chloroethyl, β-bromoethyl, β-sulfatoethyl or vinyl; $R_3$ is —$R_1$—$SO_2$—$R_2$, hydrogen, lower alkyl, benzyl, cyclohexyl, phenyl, naphthyl, mono-substituted phenyl or mono-substituted naphthyl wherein each said substituent is chloro, bromo, hydroxy, lower alkoxy, carboxy or carbalkoxy containing up to 5 carbon atoms; $n$ is an integer from 0 to 3; $m$ is an integer from 1 to 4 and $m+n$ is 3 or 4.

The dyestuffs are prepared by reacting a metal phthalocyanine sulfonic acid chloride of the formula $$MePc—(SO_2Cl)_{3-4}$$

with an amine of the formula

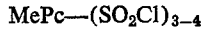  (I)

wherein $R_1$ is as defined above and $R_3'$ is $R_3$ as defined above or —$R_1$—Hal wherein $R_1$ is as defined above and Hal is chlorine or bromine. The condensation product is reacted with 2-hydroxyethylmercaptan. The ω-hydroxyethylthioether compound thus obtained is oxidized to form the corresponding sulfone. The latter is then converted into the ω-haloethyl, ω-sulfatoethyl or vinylsulfonyl compound and residual sulfochloride radicals, if any, are saponified to form sulfonic acid groups.

The order of the above reaction steps is optional. Thus, it is, for instatnce, possible to prepare at first a condensation product from the amine of Formula I above and 2-droxyethylmercaptan, to subsequently react this condensation product with the metal phthalocyanine sulfonic acid chloride and to process the ω-hydroxyethylthioether compound thus obtained as described above.

Moreover, it is also possible to directly convert the metal phthalocyanine sulfonic acid chloride with amines of the formula

  (II)

into the final dyestuffs or to first convert them with amines of the formula

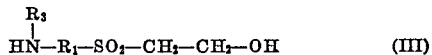  (III)

into the corresponding ω-hydroxyethylsulfones and to process the latter to the final dyestuffs.

The starting materials to be used are stable, water-insoluble metal phthalocyanines. These include complexes with copper, nickel, zinc, cobalt, aluminum, platinum, iron and vanadium which may contain chlorine or bromine substituents on the benzene moieties. The preferred complexing metals are copper, nickel and cobalt. These metal phthalocyanines are converted by heating them in chlorosulfonic acid with or without subsequent boiling with thionylchloride into the tri- or tetra-sulfonic acid chlorides or their mixtures which after the addition of ice and filtering are useful as reactive pastes for the ensuing reaction.

The reaction products prepared from a primary or secondary haloalkylamine or di-(haloalkyl)-amine hydrochloride and 2-hydroxyethylmercaptan are obtained in the form of oily liquids by heating these components with sodium alcoholate in alcohol, separating the sodium chloride which is formed and distilling off the alcohol. The reaction of the amines thus obtained as well as the amines having the Formulae I, II and III with the metal phthalocyanine sulfonic acid chlorides is advantageously carried out in an aqueous medium, whereby the hydrochloric acid by-product is neutralized by the addition of acid-binding agents, such as sodium acetate, sodium hydrogen carbonate, sodium carbonate or sodium hydroxide. The above-mentioned haloalkylamines or di-(haloalkyl)-amines are prepared from the corresponding hydroxyalkylamines or di-(hydroxyalkyl)-amines by reaction with thionylchloride in inert solvents such as chlorobenzene, dichlorobenzene, chloroform, trichloroethylene or carbontetrachloride. Such hydroxyalkylamines are for instance:

2-hydroxy-ethylamine,
2-hydroxy-N-methyl-ethylamine,
2-hydroxy-N-ethyl-ethylamine,
2-hydroxy-N-propyl-ethylamine,
2-hydroxy-N-isopropyl-ethylamine,
2-hydroxy-N-n-butyl-ethylamine,
2-hydroxy-N-benzyl-ethylamine,
2-hydroxy-N-cyclohexyl-ethylamine,
di-(2-hydroxy-ethyl)-amine,
2-hydroxy-propylamine-(1),
2-hydroxy-N-cyclohexyl-propylamine-(1),
3-hydroxy-propylamine-(1),
di[2-hydroxy-propyl-(1)]-amine,
1-hydroxy-2-methyl-propylamine-(2),
3-hydroxy-N-n-butylamine-(1),
4-hydroxy-N-n-butylamine-(1),
di-[4-hydroxy-N-butyl-(1)]-amine The phthalocyanine intermediates obtained according to the above description contain thioether groups which are oxidized to give the corresponding sulfones. The oxidation may be carried out according to different methods, for instance, with the aid of air or hydrogen peroxide with or without the addition of catalysts, for instance, tungsten or vanadium compounds or preferably with the aid of peracetic acid.

Intermediates containing β - hydroxyethylsulfonyl groups are converted according to known methods into the β-haloethyl, β-sulfatoethyl or vinylsulfonyl compounds. For example, the β-chloroethylsulfonyl compounds may be prepared by heating with thionylchloride in an inert solvent, such as nitrobenzene or phosphoric acid hexamethylamide. The β-sulfatoethylsulfonyl compounds are obtained by esterification with sulfuric acid with or without the addition of oleum or by heating with chlorosulfonic acid in solvents, such as pyridine, methylpyridines quinoline, dimethylaniline, diethylaniline, or dimethylformamide. The vinylsulfonyl compounds may be prepared from the β-chloroethyl and β-sulfatoethylsulfonyl compounds by treating with alkaline agents, such as potassium or sodium bicarbonate, potassium or sodium carbonate, triethylamine and the like.

The dyes of the present invention are useful for the dyeing and printing of hydroxyl-group containing materials, such as cellulose, e.g., cotton, linen or regenerated cellulose, such as viscose or copper silk. If these materials are treated with soluitons or printing pastes of the new dyestuffs, and the material thus impregnated or printed in the presence of alkaline-active agents is subsequently submitted to a steaming process or finally heated, while dry, at elevated temperatures, turquoise blue or bluish-green dyeings of a good fastness to wet processing are obtained. Fixing of the dyestuffs may also be done in the presence of alkalies at temperatures ranging below 100° C. In the dyeing, it is possible to use less effective reagents such as sodium hydrogen carbonate or sodium carbonate when working at higher temperatures but when working at lower temperatures alkali hydroxides should be used. In order to improve the fastness to wet processing, it is advisable to carefully rinse the obtained dyeings and prints with cold and/or hot water and optionally in the presence of a dispersing agent. The dyeings obtained with the dyestuffs of the present invention on cellulose fibers distinguish themselves by a high brilliancy of the shades and good fastness properties to washing and to light, as well as a high stability to the acid hydrolysis of the linkage between the fiber and the dyestuff. More particularly, the dyestuffs show an excellent ability to build up. Apart from being used as reactive dyestuffs for cellulose materials, the new dyes may serve to dyeing animal or synthetic fibers, such as wool, silk, leather, polyamides or polyurethanes.

The following examples are given for the purpose of illustrating the invention, the parts specified being parts by weight and the temperatures recited being in degrees centigrade.

EXAMPLE 1

57.6 parts copper phthalocyanine (calculated as the pure product) are introduced into about 600 parts chlorosulfonic acid. The mixture is heated at 125–130° and maintained for 4 hours at this temperature. After cooling down to approximately 50°, 60 parts of thionylchloride are added. The reaction mixture is heated for 2 hours at 90–95°, subsequently cooled down to approximately 20° and the tetrasulfonic acid chloride thus obtained is separated with iced water and sodium chloride and finally filtered. The paste thus obtained is stirred with finely divided ice, neutralized by the addition of sodium carbonate and admixed with 33.8 parts of β-hydroxyethyl-(β-N-methylaminoethyl)thioether. Stirring is continued for 12 hours at 0–10°, the pH value being maintained at 8–9 by the addition of diluted sodium hydroxide solution. Subsequently, the dyestuff is precipitated with hydrochloric acid and sodium chloride.

The dyestuff is diluted with water, rendered neutral and oxidized at approximately 0–10° with about 80 parts of a 20% peracetic acid to form sulfone. Stirring is continued for 3 hours at this temperature and, subseqeuntly, the reaction mixture is heated for one hour at 60–65°. The dyestuff is precipitated with hydrochloric acid and sodium chloride and then dried.

For esterification, the powder thus obtained is introduced into a mixture of 1200 parts pyridine and 175 parts chlorosulfonic acid and heated for 4 hours at 95° whereby the dyestuff goes into solution. The pyridine is partly distilled off in the vacuum. After cooling down to approximately 20°, the dyestuff is precpiitated with ice, sodium chloride and hydrochloric acid and dried at approximately 50° in the vacuum. A bluish black powder is obtained that easily dissolves in water and dyes or prints cotton turquoise blue shades. The dyestuff corresponds to the following formula:

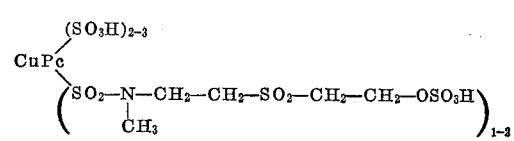

The above-mentioned β-hydroxyethyl-(β-N-methylaminoethyl)-thioether is obtained from 2-chloro-N-methylethylamine hydrochloride and 2-hydroxyethylmercaptan as follows:

(a) Preparation of the 2-chloro-N-methylethylamine hydrochloride

Into a solution of 75 parts 2-hydroxy-N-methylethylamine dissolved in 300 parts by volume of chloroform there is introduced with stirring at 0–20°, gaseous hydrochloric acid until saturation occurs. 119 parts thionylchloride are added dropwise and the mixture is then heated for 3 hours at 60°. The chloroform and the excess thionylchloride are distilled off under vacuum and the 2-chloro-N-methylethylamine precipitates in the form of the crystalline hydrochloride having a melting point of 90–91°.

(b) Preparation of the β-hydroxyethyl-(β-N-methylaminoethyl)thioether

A sodium ethylate solution is prepared from 46 parts of sodium and 750 parts by volume of ethanol and admixed with 78 parts of 2-hydroxyethylmercaptan. A solution of 130 parts 2-chloro-N-methylethylamine hydrochloride dissolved in 350 parts by volume of ethanol is then added whereby the temperature rises to about 40°. The reaction mixture is then heated for one hour at 75–78°, cooled down to approximately 20° and the precipitated sodium chloride is filtered off. The alcoholic filtrate is concentrated and the residue is distilled off in a vacuum. The boiling point of the β-hydroxyethyl-(β-N-methylaminoethyl)-thioether thus obtained is 124–130°/5–6.5 mm.

Turquoise blue dyestuffs of similar properties are obtained if instead of the 2-chloro-N-methylethylamine the hydrochlorides of the β-halogenoalkylamines enumerated in the following table are employed. These dyestuffs have the formula

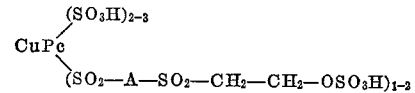

wherein A represents the residue of the β-halogenoalkylamines:

A.Hal 2-bromo-ethylamine
2-chloro-ethylamine
2-chloro-N-ethyl-ethylamine
2-chloro-N-propyl-ethylamine
2-chloro-N-isopropyl-ethylamine
2-chloro-N-butyl-ethylamine
2-chloro-N-benzyl-ethylamine,
2-chloro-N-cyclohexyl-ethylamine
2-chloro-propylamine-(1)
3-chloro-propylamine-(1)
1-chloro-2-methyl-propylamine-(2)
3-chloro-N-n-butylamine-(1)
4-chloro-N-n-butylamine-(1)

EXAMPLE 2

The tetrasulfonic acid chloric prepared, according to Example 1, from 57.6 parts copper phthalocyanine is reacted with 56.3 parts of the thioether compound

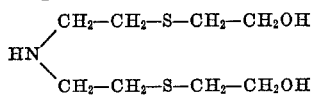

in an alkaline medium at a pH value of 8–9. The condensation product is oxidized with 160 parts of a 20% peracetic acid to form the sulfone which is converted, according to Example 1, into the β-sulfatoethylsulfonyl compound. The dyestuff thus obtained can easily be fixed when dyed and printed on cotton and yields brilliant turquoise blue shades. It has the formula:

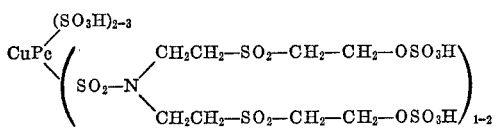

The above-mentioned thioether compound is prepared from 1 mol di-(2-chloroethyl)-amine hydrochloride and 2 mol 2-hydroxyethylmercaptan.

Turquoise blue dyestuffs of similar properties are obtained if instead of the di-(2-chloroethyl)-amine, the di-(2-chloropropyl-(1)-amine or the di-(4-chloro-N-n-butyl-(1)-amine are used.

Green dyestuffs of similar properties are obtained if instead of 57.6 parts copper phthalocyanine 57.1 parts nickel phthalocyanine are used.

EXAMPLE 3

The intermediate obtained, according to Example 1, from 57.6 parts copper phthalocyanine and having the formula

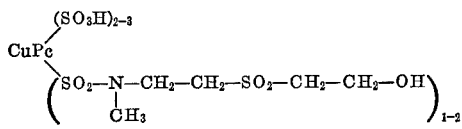

is introduced in the form of a dry powder into a mixture of 1200 parts by volume of phosphoric acid hexamethylamide and 120 parts thionylchloride and is then heated for 6 hours at approximately 70° until the formation of gaseous hydrochloric acid terminates. Under a vacuum, the solvent and the excess thionylchloride are reduced to a small volume. After cooling down to approximately 20°, the dyestuff is precipitated with iced water, sodium chloride and hydrochloric acid and dried in a vacuum at approximately 50°. It may easily be fixed on cellulose fibers and gives a clear turquoise shade. The dyestuff corresponds to the following formula:

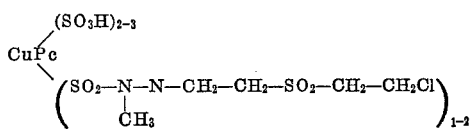

EXAMPLE 4

The paste of the phthalocyanine tetrasulfochloride prepared, according to Example 1, from 57.6 parts copper phthalocyanine is stirred with 300 g. of finely divided ice and neutralized by the addition of sodium carbonate. While vigorously stirring, 25 g. N-methyl-β-chloroethylamine are added and stirring is continued at 0–10° until the pH value has decreased to 7. Subsequently, 60 cc. of a 5 N-sodium hydroxide solution are added dropwise during one hour, stirring is continued for one hour and a solution of 24 g. hydroxyethylmercaptan dissolved in 60 cc. 5 N-sodium hydroxide is added. The reaction mixture is then heated to 80° during 4 hours, stirred for another hour at 80°, rendered neutral, cooled down and the dyestuff is precipitated with hydrochloric acid and sodium chloride. The dye paste thus obtained is washed with a saturated salt solution, diluted with water, rendered neutral and oxidized at 0–10° with 70 parts of a 20% peracetic acid to form the sulfone. Work up and further reaction is then carried out in the same manner as in Example 1.

What is claimed is:

1. A water-soluble copper phthalocyanine dyestuff of the formula

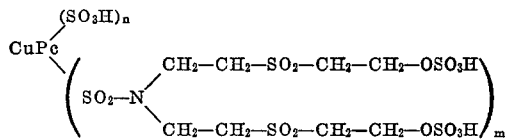

wherein CuPc is the radical of a stable, water-insoluble copper phthalocyanine; $n$ is 2 or 3; $m$ is 1 or 2 and $m+n$ is 3 or 4, said substituents on said CuPc radical being bonded to the 3-position of the benzenoid rings thereof and each benzenoid ring having no more than one substituent thereon.

References Cited

UNITED STATES PATENTS 3,647,827   3/1972   Sigiyama et al. ____ 260—314.5

HARRY I. MOATZ, Primary Examiner

U.S. Cl. X.R.

8—1 XA, 54.2; 260—457; 570.9, 571, 574, 576, 577, 583 EE